United States Patent
La Roche, Jr. et al.

(10) Patent No.: US 9,398,486 B2
(45) Date of Patent: Jul. 19, 2016

(54) CONVEYING SUBSCRIBER INFORMATION TO SERVICE CHAIN SERVICES USING TUNNEL PROTOCOL HEADER ENCAPSULATION FOR MOBILE NETWORK APPLICATIONS IN A NETWORK ENVIRONMENT

(71) Applicant: CISCO TECHNOLOGY, INC., San Jose, CA (US)

(72) Inventors: Humberto J. La Roche, Jr., Ocean, NJ (US); Hendrikus G.P. Bosch, Aalsmeer (NL); James N. Guichard, New Boston, NH (US); Paul Quinn, Wellesley, MA (US); Surendra M. Kumar, San Ramon, CA (US); Kevin D. Shatzkamer, Hingham, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 59 days.

(21) Appl. No.: 14/300,865

(22) Filed: Jun. 10, 2014

(65) Prior Publication Data

US 2015/0358850 A1     Dec. 10, 2015

(51) Int. Cl.
*H04L 12/28* (2006.01)
*H04W 28/02* (2009.01)
*H04L 12/46* (2006.01)
*H04L 12/721* (2013.01)
*H04L 12/725* (2013.01)

(52) U.S. Cl.
CPC ....... *H04W 28/0215* (2013.01); *H04L 12/4633* (2013.01); *H04L 45/306* (2013.01); *H04L 45/38* (2013.01)

(58) Field of Classification Search
USPC .......................................... 370/392, 401, 252
See application file for complete search history.

(56) References Cited

U.S. PATENT DOCUMENTS

| | | | |
|---|---|---|---|
| 7,573,879 B2 * | 8/2009 | Narad | G04L 69/161 370/392 |
| 7,895,425 B2 | 2/2011 | Khalid et al. | |
| 8,316,457 B1 | 11/2012 | Paczkowski et al. | |
| 8,612,612 B1 | 12/2013 | Dukes et al. | |
| 8,793,400 B2 * | 7/2014 | McDysan | H04L 67/2814 370/392 |
| 2008/0177896 A1 | 7/2008 | Quinn | |
| 2009/0305699 A1 | 12/2009 | Deshpande | |
| 2010/0063988 A1 * | 3/2010 | Khalid | G06F 15/16 709/202 |
| 2012/0281544 A1 * | 11/2012 | Anepu | H04B 7/0632 370/241 |
| 2013/0163594 A1 | 6/2013 | Sharma | |
| 2014/0010085 A1 | 1/2014 | Kavunder et al. | |

(Continued)

OTHER PUBLICATIONS

Quinn, P., et al., "Network Service Header," Networking Working Group Internet Draft draft-quinn-nsh-00.txt, Jun. 13, 2013, 20 pages.

(Continued)

*Primary Examiner* — Duc C Ho
(74) *Attorney, Agent, or Firm* — Patent Capital Group

(57) ABSTRACT

A method provided in one embodiment includes receiving, at a first network element, a first data packet of a data flow, wherein the data flow is associated with a subscriber. The method further includes receiving subscriber information associated with the subscriber, and encapsulating the subscriber information with the first data packet to form an encapsulated data packet. The method still further includes determining a service chain including one or more services to which the encapsulated data packet is to be forwarded, and forwarding the encapsulated data packet to the service chain.

22 Claims, 4 Drawing Sheets

(56) References Cited

U.S. PATENT DOCUMENTS

| | | |
|---|---|---|
| 2014/0334295 A1 | 11/2014 | Guichard |
| 2014/0334488 A1 | 11/2014 | Guichard |
| 2014/0362857 A1* | 12/2014 | Guichard .............. H04L 45/566 370/392 |
| 2015/0003455 A1 | 1/2015 | Haddad |
| 2015/0026362 A1 | 1/2015 | Guichard |
| 2015/0092551 A1* | 4/2015 | Moisand ............. H04L 67/1027 370/235 |
| 2015/0131484 A1* | 5/2015 | Aldrin ..................... H04L 41/12 370/254 |
| 2015/0195197 A1 | 7/2015 | Yong |
| 2015/0215172 A1 | 7/2015 | Kumar |
| 2015/0236948 A1 | 8/2015 | Dunbar |
| 2015/0271102 A1* | 9/2015 | Antich .................. H04L 45/507 370/230 |
| 2015/0333930 A1 | 11/2015 | Aysola |
| 2015/0365322 A1 | 12/2015 | Shatzkamer |

OTHER PUBLICATIONS

USPTO Dec. 4, 2015 Non-Final Office Action from U.S. Appl. No. 14/304,043.

* cited by examiner

CONVEYING SUBSCRIBER INFORMATION TO SERVICE CHAIN SERVICES USING TUNNEL PROTOCOL HEADER ENCAPSULATION FOR MOBILE NETWORK APPLICATIONS IN A NETWORK ENVIRONMENT

TECHNICAL FIELD

This disclosure relates in general to the field of communications and, more particularly, to conveying subscriber information to service chain services using tunnel protocol header encapsulation for mobile network applications in a network environment.

BACKGROUND

Networking architectures have grown increasingly complex in communication environments. An increasing emphasis exists on service providers offering infrastructure to provide for value-added services such as multimedia or other services to mobile subscribers. In general terms, service providers may provide these value-added services through the use of service chains. Service chains allow the chaining together of one or more services and/or appliances to provide for performing a particular service on a particular data flow associated with a particular subscriber. In addition, service providers often have a desire to offer use of the service chains to third-parties who may use various services and/or appliances of the service chain to realize a particular value-added service that the third party wishes to offer to subscribers. In certain instances, the third party may wish to encrypt the data flow as it passes through the service chain. However, the third party may also desire that the service provider provide particular information associated with the subscriber to the third party in order to utilize the subscriber information within the service chain.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which.

DETAILED DESCRIPTION OF EXAMPLE EMBODIMENTS

Overview

Figure 1:
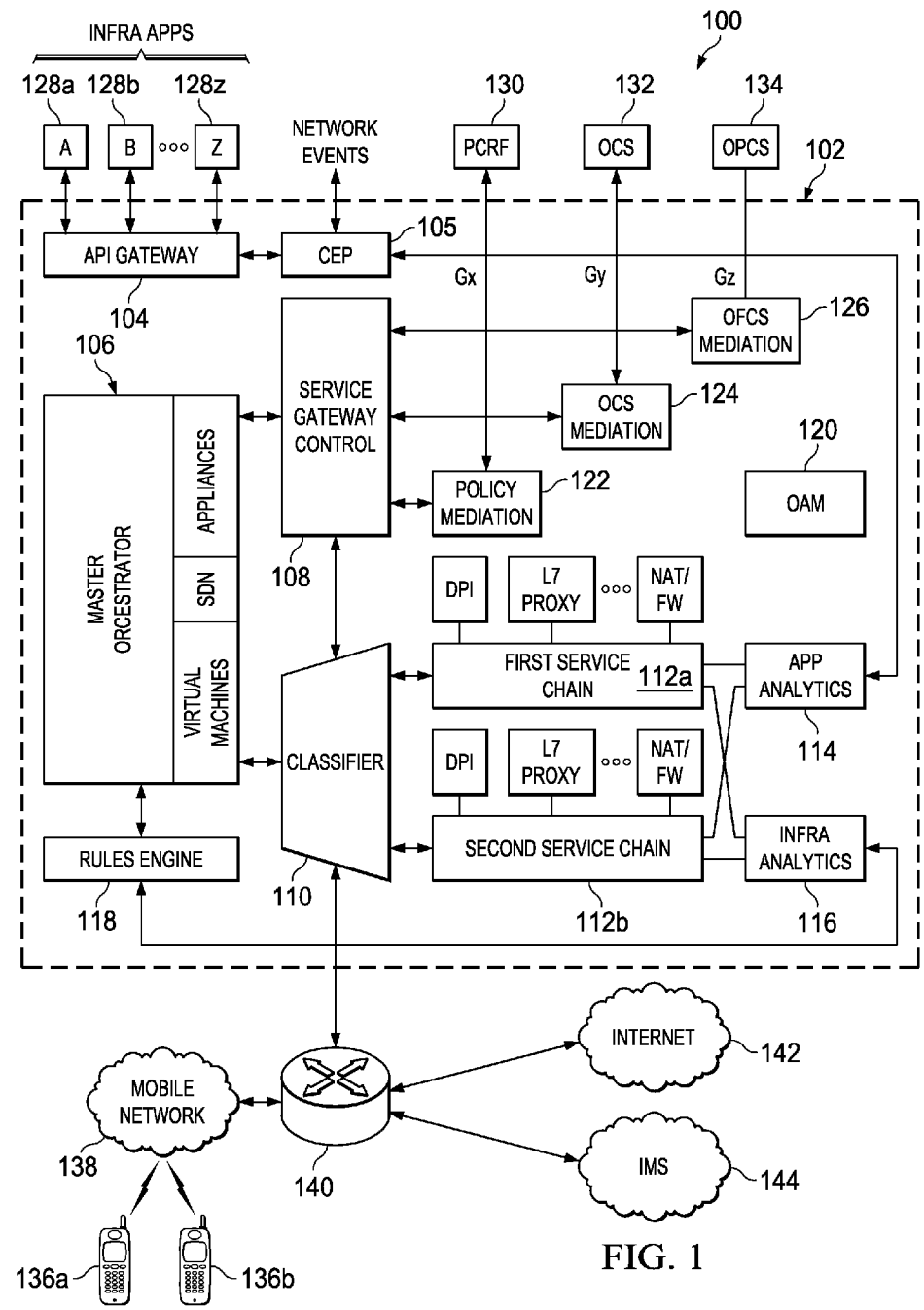
FIG. 1 is a simplified block diagram of a communication system for conveying subscriber information to services of a service chain in accordance with one embodiment of the present disclosure.

A method is provided in one embodiment and includes receiving, at a first network element, a first data packet of a data flow, wherein the data flow is associated with a subscriber. The method further includes receiving subscriber information associated with the subscriber, and encapsulating the subscriber information with the first data packet to form an encapsulated data packet. The method still further includes determining a service chain including one or more services to which the encapsulated data packet is to be forwarded, and forwarding the encapsulated data packet to the service chain.

In specific embodiments, the subscriber information includes policy information associated with the subscriber. In other specific embodiments, encapsulating the subscriber information further comprises including the subscriber information within a network service header. In other specific embodiments, the subscriber information is included within a context header of the network service header.

In specific embodiments, the method further includes receiving a second data packet from the service chain, the second data packet including an indication of one or more actions that are requested to be performed in association with the data flow. In other specific embodiments, the method further includes routing the indication of the requested action to a network entity configured to perform the requested action upon the data flow.

In other specific embodiments, the method further includes determining a subscriber identifier associated with the subscriber included in the first data packet. In still other specific embodiments, the method further includes sending a request message including the subscriber identifier to a second network element, the request message including a request for the subscriber information associated with the subscriber.

In still other specific embodiments, one or more services of the service chain are configured to extract the subscriber information and the first data packet from the encapsulated data packet and perform one or more operations upon the first data packet based upon the subscriber information.

Logic encoded in one or more non-transitory media is provided in one embodiment that includes code for execution and when executed by a processor operable to perform operations comprising receiving, at a first network element, a first data packet of a data flow, wherein the data flow is associated with a subscriber, receiving subscriber information associated with the subscriber, and encapsulating the subscriber information with the first data packet to form an encapsulated data packet. The operations further include determining a service chain including one or more services to which the encapsulated data packet is to be forwarded, and forwarding the encapsulated data packet to the service chain.

A network element is provided in one embodiment and includes a memory element configured to store electronic code, a processor operable to execute instructions associated with the electronic code, and a module coupled to the memory element and the processor. The network element is configured for receiving a first data packet of a data flow, wherein the data flow is associated with a subscriber, receiving subscriber information associated with the subscriber, and encapsulating the subscriber information with the first data packet to form an encapsulated data packet. The network element is further configured for determining a service chain including one or more services to which the encapsulated data packet is to be forwarded, and forwarding the encapsulated data packet to the service chain.

Example Embodiments

Referring now to FIG. 1, FIG. 1 is a simplified block diagram of a communication system 100 for conveying subscriber information to services of a service chain in accordance with one embodiment of the present disclosure. Communication system 100 includes a service provider core platform 102 including an application programming interface (API) gateway 104, complex event processing (CEP) module 105, master orchestrator module 106, service gateway control 108, classifier 110, first service chain 112a, second service chain 112b, application analytics module 114, infrastructure analytics module 116, rules engine 118, operations, administration and management (OAM) module 120, policy mediation module 122, online charging system (OCS) mediation module 124, and offline charging system (OfCS) mediation module 126.

API gateway 104 is in communication with CEP module 105, and CEP module 105 is in further communication with application analytics module 114. Master orchestrator module 106 is in communication with service gateway control 108, classifier 110, and rules engine 118. Service gateway control 108 is in further communication with classifier 110, policy mediation module 122, OCS mediation 124, and OfCS mediation module 126. Classifier 110 is in further communication with first service chain 112a and second service chain 112b. First service chain 112a and second service chain 112b are each in further communication with application analytics module 114 and infrastructure analytics module 116. Infrastructure analytics module 116 is in further communication with rules engine 118.

Communication system 100 further includes one or more infrastructure applications 128a-128z in communication with API gateway 104, a policy and charging rules function (PCRF) 130 in communication with policy mediation module 122 via a Gi interface, an OCS 132 in communication with OCS mediation module 124 via a Gy interface, and an OfCS 134 in communication with OfCS mediation module 126 via a Gz interface. Communication system 100 further includes first user equipment (UE) 136a and second user equipment (UE) 136b in communication with a mobile network 138. Mobile network 138 is in further communication with a load balancing router 140. Load balancing router 140 is in further communication with classifier 110 of service provider core platform 102, the Internet 142, and an IP Multimedia System (IMS) 144. IMS 144 is configured to provide IP multimedia services to one or more of first UE 136a and second UE 136b.

API gateway 104 is configured to provide integration of infrastructure applications 128a-128z with service provider core platform 102 such as enabling programmability of services infrastructure via one or more of infrastructure applications 128a-128z. CEP 105 is configured to receive information related to one or more networks event data sources, analyze the received information and identify one or more network events based upon the analysis. Master orchestrator module 106 is configured to perform various resource management functions within a virtualized environment of the service provider core platform 102 virtual machine management, software defined network (SDN) layer management, and virtual appliance management. Although various embodiments described herein related to virtual environments, it should be understood that the principles are equally applicable to physical environments as well.

Service gateway control 108 is configured to receive subscriber specific information associated with a particular data flow from one or more sources such as PCRF 130, OCS 132, and OfCS 134 as will be further described herein. PCRF 130 may be configured to provide subscriber-specific information related to policy and charging rule functions, OCS 132 may be configured to provide subscriber-specific information related to online charging, and OfCS 134 may be configured to provide subscriber-specific information related to offline charging. In particular embodiments, policy mediation module 122, OCS mediation module 124, and OfCS mediation module 126 may be configured to provide mediation operations on the subscriber-specific policy, online charging, and offline charging information, respectively, before it is provided to service gateway control 108. In accordance with various embodiments, service gateway control 108 may be further configured to provide the subscriber-specific information related to a particular data flow to classifier 110.

Classifier 110 is configured to receive data flow packets associated with a particular subscriber and the subscriber-specific information received from service gateway control 108 and embed the subscriber-specific information within the data flow packets as will be further described herein. In a particular embodiment, the subscriber-specific information is included within a header appended to the existing data flow packets of the data flow associated with the particular subscriber. Classifier 110 is further configured to send the data flow packets having the included subscriber-specific information to one or more of first service chain 112a and second service chain 112b. Each of first service chain 112a and second service chain 112b include one or more appliances that are configured in a "chain" to perform one or more services and/or functions upon the data flow. In the particular embodiment illustrated in FIG. 1, first service chain 112a and second service chain 112b each include a deep packet inspection (DPI) appliance, an L7 Proxy appliance, and a network address translation(NAT)/firewall appliance. In particular embodiments, first service chain 112a and second service chain 112b are each virtual service chains utilizing virtual appliances to perform the services and/or functions upon a particular data flow associated with a subscriber. In one or more embodiments, each of first service chain 112a and second service chain 112b are configured to extract the subscriber-specific information embedded within the packet data for a particular flow and utilize the subscriber-specific information to perform the specific services and/or functions.

Application analytics module 114 is configured to collect analytics related to applications within communication system 100, and infrastructure analytics 116 is configured to collect analytics related to infrastructure associated with communication system 100. Rules engine 118 is configured to modify rules associated with the master orchestration module 106 in response to changes in one or more conditions within the network infrastructure. OAM 120 is configured to allow configuration, management, and maintenance operations of various component of service provider core platform 102 by an operator.

Each of first UE 136a and second UE 136b is configured to include a cellular radio capable of communicating with mobile network 138. Each of first UE 136a and second UE 136b may be associated with clients or customers wishing to initiate a communication in communication system 100 via some network. The term 'user equipment' is interchangeable with the terminology 'endpoint' and 'wireless device', where such terms are inclusive of devices used to initiate a communication, such as a computer, a personal digital assistant (PDA), a laptop or electronic notebook, a cellular telephone, an i-Phone, an i-Pad, a Google Droid, an IP phone, or any other device, component, element, or object capable of initiating voice, audio, video, media, or data exchanges within communication system 100.

Each of first UE 136a and second UE 136b may also be inclusive of a suitable interface to the human user, such as a microphone, a display, a keyboard, or other terminal equipment. Each of first UE 136a and second UE 136b may also be any device that seeks to initiate a communication on behalf of another entity or element, such as a program, a database, or any other component, device, element, or object capable of initiating an exchange within communication system 100. Data, as used herein in this document, refers to any type of numeric, voice, video, or script data, or any type of source or object code, or any other suitable information in any appropriate format that may be communicated from one point to another.

In typical mobile applications, a mobility anchor (e.g., a Gateway GPRS Support Node (GGSN) or Packet Data Network-Gateway (PDN-GW)) separates the mobile access from packet data networks such as the Internet. Between the mobility anchor and the Packet Data Network (Internet) is a system of value-added services (VAS) comprised of cascaded individual services (e.g., appliances) that use the subscriber identity as well as other knowledge of the subscriber (e.g. the subscriber session record) in making decisions regarding how the services are implemented for that specific subscriber. The subscriber session record may include the Mobile Station International Subscriber Directory Number (MSISDN), the International Mobile Subscriber Identify (IMSI), the radio access technology (RAT)-type, as well as policy related information. It is usually maintained dynamically in the mobility anchor but is conveyed to a policy manager (such as PCRF 130), which can retrieve it using the IP address of the mobile device as a key. For Hypertext Transfer Protocol (HTTP) traffic, one method of conveying the subscriber session record is by enriching an HTTP header.

Enriching traffic does not work for encrypted traffic. Much of the traffic today is carried by way of an encrypted tunnel e.g. through Secure Sockets Layer/Transport Layer Security (SSL/TLS) sessions for HTTPS and most SPDY traffic: the (mobile) node sets up an encrypted end-to-end tunnel rendering any man-in-the-middle service enhancements useless. Encrypting traffic is becoming the norm in mobile and non-mobile networks. Various embodiments described herein provide by conveying subscriber information with encrypted or unencrypted traffic.

Various embodiments described herein may provide for conveying subscriber session record information from the mobility anchor to any appliance in the mobile VAS complex by (a) making the VAS multi-tenant, (b) enabling hosting by the (mobile) service provider appliances associated with the third parties managing the ciphered end-point (c) exchanging subscriber session records with third parties in exchange for QoS and other transport specific information by way of subscriber records carried in a multi-tenant tunnel and (d) establishing a business relationship between (mobile) service provider and the third party.

Typically, a Software Defined Network (SDN) is formed of three elements. The first element is a logical connectivity view between services (e.g., appliances) and workflows provided by a topology of tunnels of encapsulated packets overlaid onto a physical network substrate. The second element is a special workflow called the "forwarder" which controls the forwarding of encapsulated packets between those tunnels. A third element is a control entity which can be centralized or distributed, the SDN controller, the function of which is to program the forwarder.

A VAS complex supporting the processing of flows and packets can be implemented using SDN techniques. For example, service chains, the basic construct that defines the sequencing of services that process packet flows, may be implemented as an SDN-based service chain. The SDN implementation of a service chain creates an overlay that interconnects services that are attached to forwarders.

In such an SDN-based service chain, a set of forwarders steer the traffic through all the services in the chain on an overlay network. These forwarders logically connect (on a per flow basis) the ports of the services in series in addition to connecting the first and last ports to external networks. For instance, port A1 of the first service (service "A") is connected to the mobility core and port A2 to the next service (service "B") in the chain. The next service B is in turn connected to service C and service A, and also has similar ports B1 (connected to A2) and B2 (connected to C1). In this series the last service (service "X") connects to the prior service via port X1 and to the packet data network via port X2. Subscriber traffic is steered in either direction, by the forwarders, over this logical service path. In this example, service A is the mobility anchor (PDN-GW or GGSN). It therefore has complete knowledge of the subscriber session record received from an external policy node, and can insert a representation of this subscriber information as a service specific header in the tunnel encapsulation. An example of such a service header is the NSH/vPath 3.0 as defined in EDCS-1236506. In accordance with various embodiments, the forwarders in the path of the service chain have access to the service header and can present the subscriber session record (or part thereof) to the appliance either natively as metadata via the service header or via auxiliary "third ports" B3, C3, . . . used by the services for those purposes.

When the VAS is multi-tenant, third party providers can host their appliances in the infrastructure of the service provider hosting VAS. The prime benefits for hosting such appliances in the VAS is that the third party provider operates directly in the service provider's infrastructure, is close (in terms of latency) to the subscriber, and, especially if the provided service includes shipping lots of cacheable information, can avoid peering costs for both the third party provider and the VAS operator.

Given that the VAS operator and 3rd party provider share an infrastructure, a control channel may be implemented between the third party provider and the VAS operator. In accordance with particular embodiments, a header, such as NSH/vPath 3.0 tunnel header, is used to implement a control channel between the VAS and third party provider operators. The control channel may be used to carry subscriber-specific information including parameters pertaining to the subscriber (such as IMSI, MSISDN, quality class, max. QoS parameters, etc . . . ) from the VAS operator to the third party provider. The third party provider may request certain QoS parameters for traffic destined to the mobile subscriber, and can indicate how return traffic from the subscriber to the third party provider needs to be treated. In addition, the control channel can be used by the third party provider to generate charging records counted against the subscriber's subscription, or, the VAS operator can charge access through its system for the third party provider by sending charging records over the control channel.

Accordingly, various embodiments described herein use a service header to convey detailed mobile subscriber information to services offered by a mobile operator. Since in many cases the subscriber traffic is encrypted, the service header metadata is the only way to derive needed subscriber information. One advantage that may be provided in some embodiments is that services that require subscriber information can have access to such information via the service header. For services that do not support the service header natively, the information may be conveyed out-of-band. If the encapsulated traffic is encrypted, as is often the case in mobile networks, then various embodiments provide a viable option for the conveyance of subscriber session records or other subscriber-specific information when an enriched header option is not possible. In a particular application of operator hosting of a content provider, the subscriber session record contains valuable information about the user of mobile services that can be used by the content provider to personalize the service experience.

Referring again to FIG. 1, first UE 136a sends data traffic flow packets to mobile network 138 which pass through load balancing router 140 and are forwarded to classifier 110 of service provider core platform 102. Service gateway control 108 receives subscriber information associated with the data flow packets from one or more elements within communication system 100. In a particular embodiment, service gateway control 108 receives subscriber information in the form of policy information associated with the particular data flow from the policy infrastructure such as PCRF 130. Service gateway control 108 sends the subscriber information associated with the data flow to classifier 110 and encapsulates the subscriber information associated with the data flow within the data flow. In a particular embodiment, classifier 110 appends a network service header containing the subscriber information to the data flow associated with the subscriber. Classifier 110 then forwards the data flow including the encapsulated subscriber information to a particular service chain such as first service chain 112a. Each of the services and/or appliances may look at the NSH header to determine the subscriber identity associated with the data packet. Accordingly, all of the services and/or appliances of first service chain 112a (for example, DPI services, NAT functions, firewall, etc.) have a record of which subscriber originated the flow and can perform policy related operations on that flow without having to look inside the packets of the data flow. For example, each individual application and/or service can look at the network service header to identify the subscriber that is sending the data flow packet and determine what operations or services should be applied to the data flow based upon the subscriber information included in the network service header. This may be especially important if the flow is encrypted and it is not possible to look inside the flow. The packets at the end of first service chain may then be forwarded to their destination such as the Internet 142. Similarly, on the way back a return packet from the Internet may be send from load balancing router 140 to classifier 110.

In accordance with some embodiments, a service and/or appliance of one or more of first service chain 112a and second service chain 112b may send one or more return data packets back to classifier 110 having an indication of one or more actions that are requested to be performed in association with the data flow of the subscriber. In particular embodiments, the one or more actions may include QoS actions, QCI actions, billing actions, rating actions, network actions (e.g., WiFi handoff), implementing a traffic steering rule, and service invocation (e.g., media optimization). In a particular example, a service and/or appliance may request that the particular data flow associated with the subscriber be moved to a higher quality channel. In response to receiving the return data packets, classifier 110 may route the indication of the requested action to the appropriate network entity, element, or component within communication network 100 configured to perform the requested action upon the data flow to determine whether the requested action is to be fulfilled. In another example, classifier 110 may communicate a subscriber's billing plan to a service of the service chain, and the service may communicate back to classifier 110 with an indication of the manner in which the subscriber should be charged for the service. In still another example, classifier 110 may communicate the network QoS to a service, and in response the service may communicate an indication of the required QoS for the particular service back to classifier 110.

In another example, one or more services of a service chain may be used to implement an Over-The-Top (OTT) voice service. In such an example, classifier 110 may send subscriber information in an NSH to a Web Real-Time Communication (WebRTC) service within a virtual service chain that includes a subscriber identity (e.g., IMSI/MSISDN), a subscriber location (e.g., Cell ID/Sector ID), device-specific information related to the capabilities of the UE, and an indication of available supplementary services. In response, the WebRTC service may send a return message including a required QoS, a Communications Assistance for Law Enforcement Act (CALEA) or Lawful Intercept request, a charging/rating rule base, and an indication to invoke one or more supplementary services.

Figure 2:
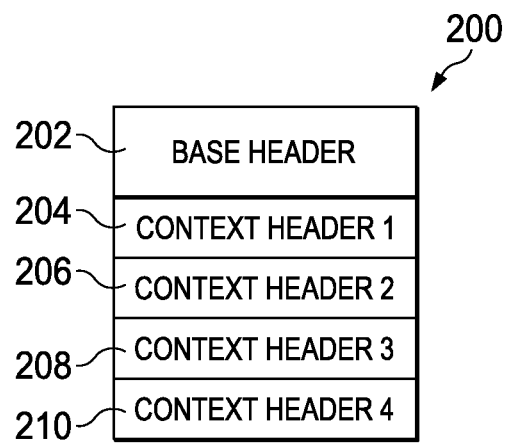
FIG. 2 is a simplified block diagram of a network service header (NSH) according to one embodiment.

Referring now to FIG. 2, FIG. 2 is a simplified block diagram of a network service header (NSH) 200 according to one embodiment. Network service header 200 include a base header 202, a first context header 204, a second context header 2066, a third context header 208, and a fourth context header 210. In at least one embodiment, base header 202 includes an indication of the protocol type of the data packet, a service index that is decremented by service nodes after performing required services, and a service path identifier to identify a particular service path. Base header 202 facilitates service chaining by allowing traffic to be sent between different services in a service chain (e.g., DPI, NAT, firewall, etc.). In accordance with various embodiments, one or more of first context header 204, second context header 206, third context header 208, and fourth context header 210 may include subscriber-specific information associated with the data flow within the context data portion of the respective context header. Examples of subscriber specific data that may include a subscriber identifier such as the IMSI or MSISDN, subscriber profile information, subscriber location information, access type, charging parameters, quality class information, QoS parameters, and network condition information.

Figure 3:
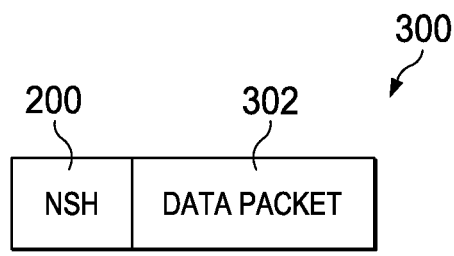
FIG. 3 is a simplified block diagram of a packet including a data packet having an embedded network service header (NSH) according to one embodiment.

Referring now to FIG. 3, FIG. 3 is a simplified block diagram of a packet 300 including a data packet having an embedded network service header (NSH) according to one embodiment. Packet 300 includes a network service header 200 appended to a data packet 302. Network service header 200 includes subscriber information associated with a subscriber. Data packet 302 includes a packet associated of a data flow associated with the subscriber. In a particular embodiment, data packet 302 may be an encrypted data packet while network service header 200 is unencrypted. In still another particular embodiment, data packet 302 may be an unencrypted data packet. In one or more embodiments, classifier 110 receives the subscriber information associated with the data flow from service gateway control 108, generates network service header 200 including the subscriber information contained within the context data of the network service header 200, and appends network service header 200 to data packet 302. Classifier 110 may then determine the particular service chain to which packet 300 is to be forwarded and forward packet 300 to one of first service chain 112a and second service chain 112b. One or more appliances and/or services within the particular service chain may extract the subscriber information from the network service header and use the subscriber information to perform the service upon the data packet and/or determine the particular operations that should be performed on data packet 302.

Figure 4:
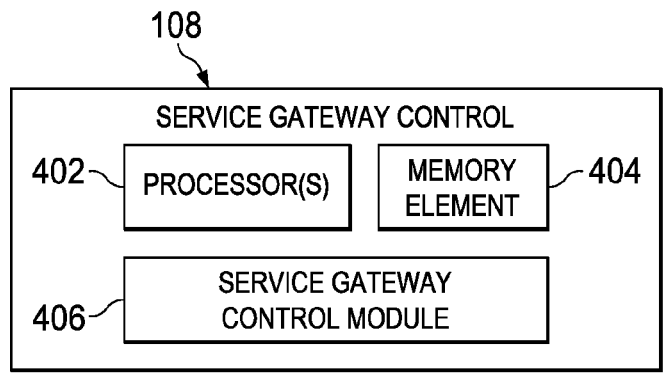
FIG. 4 is a simplified block diagram of a service gateway control in accordance with one embodiment.

Referring now to FIG. 4, FIG. 4 is a simplified block diagram of service gateway control 108 in accordance with one embodiment. Service gateway control 108 includes one or more processors 402, a memory element 404, and a service gateway control module 406. Processor(s) 402 is configured to execute various tasks of service gateway control 108 as described herein and memory element 404 is configured to store data associated with service gateway control 108. Service gateway control module 406 is configured to perform the various subscriber information collection functions of service gateway control 108 as described herein. In particular embodiments, service gateway control module 406 is configured to receive subscriber information, such as policy information, associated with a data flow of a particular UE and send the subscriber information to classifier 110.

Figure 5:
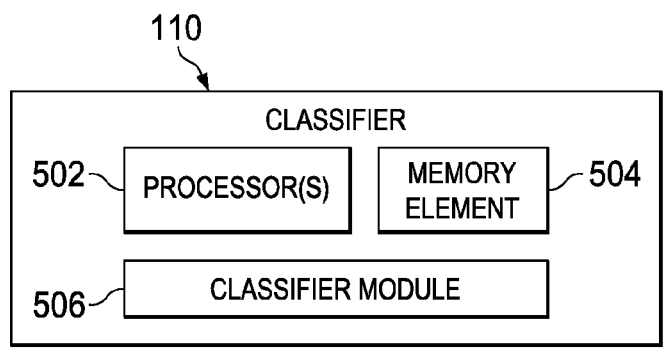
FIG. 5 is a simplified block diagram of a classifier in accordance with one embodiment.

Referring now to FIG. 5, FIG. 5 is a simplified block diagram of classifier 110 in accordance with one embodiment. Classifier 110 includes one or more processors 502, a memory element 504, and a classifier module 506. Processor 502 is configured to execute various tasks of classifier 110 as described herein and memory element 504 is configured to store data associated with classifier 110. Classifier module 506 is configured to perform the various classification functions of classifier 110 as described herein. In a particular embodiment, classifier module 506 is configured to receive one or more data packets of a data flow associated with a particular subscriber, receive subscriber information associated with the subscriber, and include the subscriber information in a network service header. Classifier module 506 may be further configured to encapsulate the network service header with the data packet and forward the encapsulated data packet of a particular service chain.

In one example implementation, service gateway control 108 and/or classifier 110 are network elements that facilitate or otherwise help coordinate subscriber information encapsulation activities (e.g., for networks such as those illustrated in FIG. 1). As used herein in this Specification, the term 'network element' is meant to encompass network appliances, servers, routers, switches, gateways, bridges, loadbalancers, firewalls, processors, modules, base stations, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

In one example implementation, service gateway control 108 and/or classifier 110 include software to achieve the operations, as outlined herein in this document. In other embodiments, this feature may be provided external to these elements, or included in some other network device to achieve this intended functionality. Alternatively, both elements include software (or reciprocating software) that can coordinate in order to achieve the operations, as outlined herein. In still other embodiments, one or both of these devices may include any suitable algorithms, hardware, software, components, modules, interfaces, or objects that facilitate the operations thereof.

Figure 6:
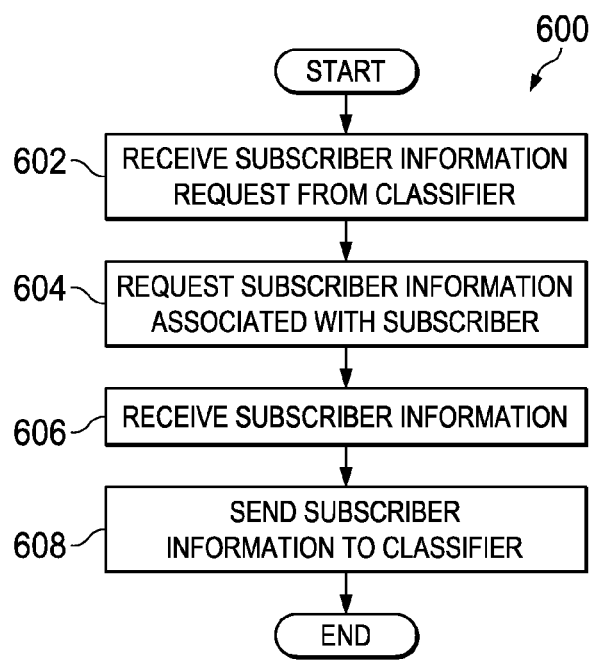
FIG. 6 is a simplified flow diagram depicting a flow associated with the service gateway control according to one embodiment.

Referring now to FIG. 6, FIG. 6 is a simplified flow diagram depicting a flow 600 associated with service gateway control 108 according to one embodiment. In 602, service gateway control 108 receives a request for subscriber information associated with a particular subscriber from classifier 110. In a particular embodiment, classifier 110 may send the request for subscriber information to service gateway control 108 in response to receiving a data packet of a data flow associated with the particular subscriber. In one or more embodiments, the request for subscriber information may include a subscriber identifier identifying the particular subscriber associated with the data flow. In 604, service gateway control 108 requests subscriber information associated with the subscriber identifier from one or more elements and/or components of communication system 100. In a particular example, service gateway control 108 requests the subscriber information in the form of policy information associated the subscriber from PCRF 130. In 606, service gateway control 108 receives the requested subscriber information. In still other examples, the requested subscriber information may include one or more of a subscriber name, channel state, access type, charging state, QoS state, QoS class identifier (QCI) values, subscriber profile information, subscriber interests, subscriber location information, subscriber mobility patterns, device type, access type, QoS rules, and network overload conditions. In 608, service gateway control 108 sends the requested subscriber information to classifier 110 and flow 600 ends.

Figure 7:
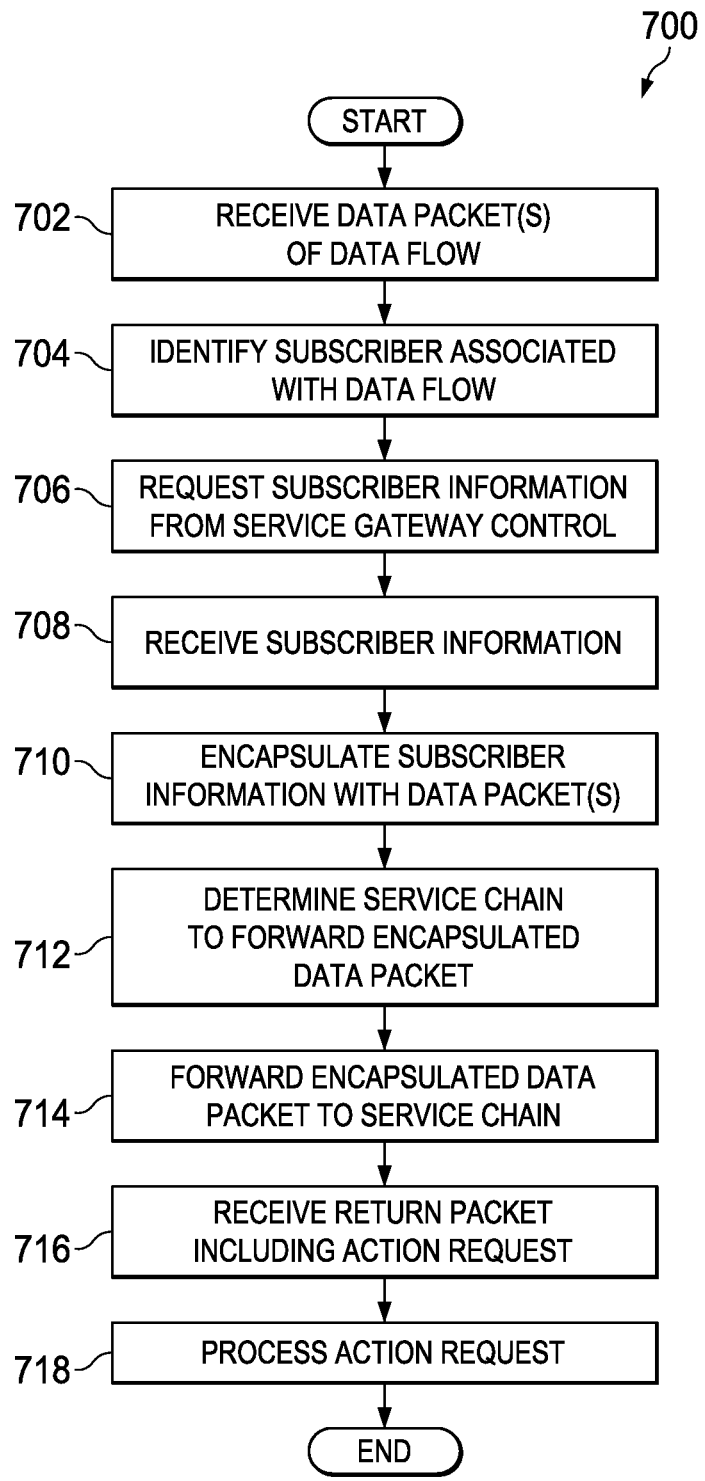
FIG. 7 is a simplified flow diagram depicting a flow associated with the classifier according to one embodiment.

Referring now to FIG. 7, FIG. 7 is a simplified flow diagram depicting a flow 700 associated with classifier 110 according to one embodiment. In 702, classifier 110 receives one or more data packets of a data flow associated with a particular subscriber. In a particular embodiment, the data packets are associated with a subscriber of first UE 136a. In 704, classifier 110 identifies the subscriber associated with the one or more data packets. In one or more embodiments, classifier 110 may identify the subscriber by determining a subscriber identifier included in the one or more data packets. In a particular embodiment, the subscriber identifier may include the MSISDN and/or IMSI associated with the subscriber. In 706, classifier 110 requests subscriber information associated with the subscriber from service gateway control 108. In a particular embodiment, classifier 110 may send a request message including the subscriber identifier to service gateway control 108. In still another embodiment, the request message may further include an indication of the particular subscriber information that is requested. In response to receiving the request, service gateway control 108 may collect the requested subscriber information and send the requested subscriber information to classifier 110.

In 708, classifier 110 receives the subscriber information from the service gateway control 108. In 710, classifier 110 encapsulates the subscriber information with the received data packet to form an encapsulated data packet. In one or more particular embodiments, classifier 110 generates a network service header including the requested subscriber information in one or more context headers of the network service header and appends the network service header to the received data packet to generate the encapsulated data packet.

In 712, classifier 110 determines whether the encapsulated data packet is to be forwarded to either first service chain 112a or second service chain 112b. In particular embodiments, classifier 110 determines whether to forward the encapsulated data packet to either first service chain 112a or second service chain 112b based upon one or more of the subscriber identity and/or one or more subscriber parameters within the received subscriber information. In 714, classifier 110 forwards the encapsulated data packet to either first service chain 112a or second service chain 112b based upon the determination. In response to receiving the encapsulated data packet, one or more services of the service chain may extract the subscriber information and data packet and perform one or more services and/or operations upon the data packet based upon the subscriber information.

In some embodiments, the one or more services of the service chain may send a return data packet to classifier 110 including an indication of a request for one or more actions to be performed on the data flow associated with the subscriber.

In 716, classifier 110 receives a return packet including the indication of the request for one or more actions to be performed on the data flow associated with the subscriber. In 718, classifier 110 processes the action request and flow 700 ends. In a particular embodiment, classifier 110 processes the action request by routing the indication of the requested action to the appropriate network entity, element, or component within communication network 100 configured to perform the requested action upon the data flow to determine whether the requested action is to be fulfilled. In particular embodiments, the one or more actions may include QoS actions, QCI actions, billing actions, rating actions, network actions (e.g., WiFi handoff), implementing a traffic steering rule, and service invocation (e.g., media optimization). In response to receiving the return data packets, classifier 110 may route the indication of the requested action to the appropriate entity, element, or component within communication network 100 to determine whether the requested action is to be fulfilled.

In regards to the internal structure associated with communication system 100, each of service gateway control 108 and classifier 110 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to service gateway control 108 and classifier 110 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements [as shown in FIGS. 4 and 5] can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors [as shown in FIGS. 4 and 5] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 100 may be applicable to other exchanges, routing protocols, or routed protocols. Moreover, although communication system 100 has been illustrated with reference to particular elements and operations that facilitate the communication process, these elements and operations may be replaced by any suitable architecture or process that achieves the intended functionality of communication system 100.

In a separate endeavor, communication system 100 may generally be configured or arranged to represent a 3G architecture applicable to UMTS environments in accordance with a particular embodiment. However, the 3G architecture is offered for purposes of example only and may alternatively be substituted with any suitable networking system or arrangement that provides a communicative platform for communication system 100. Moreover, the present disclosure is equally applicable to other cellular and/or wireless technology including CDMA, Wi-Fi, WiMAX, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
receiving, at a first network element, a first data packet of a data flow, wherein the data flow is associated with a subscriber;
receiving subscriber information associated with the subscriber;
encapsulating the subscriber information with the first data packet to form an encapsulated data packet;
determining a service chain including one or more services to which the encapsulated data packet is to be forwarded;
forwarding the encapsulated data packet to the service chain; and
receiving a second data packet from the service chain, the second data packet including an indication of one or more actions that are requested to be performed in association with the data flow.

2. The method of claim 1, wherein the subscriber information includes policy information associated with the subscriber.

3. The method of claim 1, wherein encapsulating the subscriber information further comprises including the subscriber information within a network service header.

4. The method of claim 3, wherein the subscriber information is included within a context header of the network service header.

5. The method of claim 1, further comprising routing the indication of the requested action to a network entity configured to perform the requested action upon the data flow.

6. The method of claim 1, further comprising determining a subscriber identifier associated with the subscriber included in the first data packet.

7. The method of claim 6, further comprising sending a request message including the subscriber identifier to a second network element, the request message including a request for the subscriber information associated with the subscriber.

8. The method of claim 1, wherein the one or more services of the service chain are configured to extract the subscriber information and the first data packet from the encapsulated data packet and perform one or more operations upon the first data packet based upon the subscriber information.

9. Logic encoded in one or more non-transitory media that includes code for execution and when executed by a processor operable to perform operations comprising:
receiving, at a first network element, a first data packet of a data flow, wherein the data flow is associated with a subscriber;
receiving subscriber information associated with the subscriber;
encapsulating the subscriber information with the first data packet to form an encapsulated data packet;
determining a service chain including one or more services to which the encapsulated data packet is to be forwarded;
forwarding the encapsulated data packet to the service chain; and
receiving a second data packet from the service chain, the second data packet including an indication of one or more actions that are requested to be performed in association with the data flow.

10. The logic of claim 9, wherein the subscriber information includes policy information associated with the subscriber.

11. The logic of claim 9, wherein encapsulating the subscriber information further comprises including the subscriber information within a network service header.

12. The logic of claim 11, wherein the subscriber information is included within a context header of the network service header.

13. The logic of claim 9, wherein the operations further comprise routing the indication of the requested action to a network entity configured to perform the requested action upon the data flow.

14. The logic of claim 9, wherein the operations further comprise determining a subscriber identifier associated with the subscriber included in the first data packet.

15. The logic of claim 14, wherein the operations further comprise sending a request message including the subscriber identifier to a second network element, the request message including a request for the subscriber information associated with the subscriber.

16. The logic of claim 9, wherein the one or more services of the service chain are configured to extract the subscriber information and the first data packet from the encapsulated data packet and perform one or more operations upon the first data packet based upon the subscriber information.

17. A network element, comprising:
a memory element configured to store electronic code;
a processor operable to execute instructions associated with the electronic code; and
a module coupled to the memory element and the processor, wherein the network element is configured for:
receiving a first data packet of a data flow, wherein the data flow is associated with a subscriber;
receiving subscriber information associated with the subscriber;
encapsulating the subscriber information with the first data packet to form an encapsulated data packet;
determining a service chain including one or more services to which the encapsulated data packet is to be forwarded;
forwarding the encapsulated data packet to the service chain; and
receiving a second data packet from the service chain, the second data packet including an indication of one or more actions that are requested to be performed in association with the data flow.

18. The network element of claim 17, wherein the subscriber information includes policy information associated with the subscriber.

19. The network element of claim 17, wherein encapsulating the subscriber information further comprises including the subscriber information within a network service header.

20. The network element of claim 19, wherein the subscriber information is included within a context header of the network service header.

21. The network element of claim 17, wherein the network element is further configured for routing the indication of the requested action to a network entity configured to perform the requested action upon the data flow.

22. The network element of claim 17, wherein the one or more services of the service chain are configured to extract the subscriber information and the first data packet from the encapsulated data packet and perform one or more operations upon the first data packet based upon the subscriber information.

\* \* \* \* \*